US011053041B2

(12) United States Patent
Peterlini

(10) Patent No.: US 11,053,041 B2
(45) Date of Patent: Jul. 6, 2021

(54) DEVICE AND METHOD FOR PACKING A CUSHIONING ELEMENT IN A CARTON

(71) Applicant: GP SYSTEM, Annecy-le-Vieux (FR)

(72) Inventor: Jacky Peterlini, Annecy-le-Vieux (FR)

(73) Assignee: GP System, Annecy-le-Vieux (FR)

( * ) Notice: Subject to any disclaimer, the term of this patent is extended or adjusted under 35 U.S.C. 154(b) by 226 days.

(21) Appl. No.: 16/304,671

(22) PCT Filed: May 24, 2017

(86) PCT No.: PCT/FR2017/051285
§ 371 (c)(1),
(2) Date: Nov. 26, 2018

(87) PCT Pub. No.: WO2017/203169
PCT Pub. Date: Nov. 30, 2017

(65) Prior Publication Data
US 2020/0324929 A1  Oct. 15, 2020

(30) Foreign Application Priority Data

May 27, 2016 (FR) ...................................... 1654813

(51) Int. Cl.
*B65B 55/20* (2006.01)
*B25J 9/00* (2006.01)
(Continued)

(52) U.S. Cl.
CPC ............. *B65B 55/20* (2013.01); *B25J 9/0093* (2013.01); *B25J 9/023* (2013.01); *B25J 15/0052* (2013.01);
(Continued)

(58) Field of Classification Search
CPC ... B65B 35/16–18; B65B 43/52; B65B 55/20; B65B 63/02; B65B 63/028; B65H 5/14; B65H 5/08
(Continued)

(56) References Cited

U.S. PATENT DOCUMENTS 3,381,452 A    5/1968  Gentry et al.
3,651,614 A *  3/1972  Corderoy ........... B65D 5/48026
                                                                53/474
(Continued)

FOREIGN PATENT DOCUMENTS

EP    1 410 995 A1    4/2004
EP    1 449 777       8/2004
(Continued)

OTHER PUBLICATIONS

International Search Report (with English translation) dated Aug. 11, 2017 for International application No. PCT/FR2017/051285.
(Continued)

*Primary Examiner* — Valentin Neacsu
(74) *Attorney, Agent, or Firm* — Fay Sharpe LLP

(57) ABSTRACT

An automatic packing device (1) for cushioning element (s) (2) in a carton (C) is mounted along a conveyor (4) directed along a longitudinal axis (Y, Y'). The packing device (1) includes a robotic cell (3) associated with a cushioning element storage zone (2), the robotic cell (3) including at least one gripping device fo a cushioning element (2). The storage zone includes at least one magazine (18) with at least one cassette (8) movable along a transverse axis (X, X') from a loading position to an unloading position.

8 Claims, 4 Drawing Sheets

(51) Int. Cl.
*B25J 9/02* (2006.01)
*B25J 15/00* (2006.01)
*B25J 15/02* (2006.01)
*B65B 35/16* (2006.01)
*B65B 43/52* (2006.01)
*B65B 63/02* (2006.01)

(52) U.S. Cl.
CPC .......... *B25J 15/0253* (2013.01); *B65B 35/16* (2013.01); *B65B 43/52* (2013.01); *B65B 63/02* (2013.01)

(58) Field of Classification Search
USPC .......................................... 53/436, 472, 115
See application file for complete search history.

(56) References Cited

U.S. PATENT DOCUMENTS

| | | | | |
|---|---|---|---|---|
| 5,829,231 | A * | 11/1998 | Harding | B31D 5/0047 53/493 |
| 6,718,729 | B2 * | 4/2004 | Manley | B31D 5/0039 493/12 |
| 7,665,275 | B2 | 2/2010 | Meessen | |
| 7,788,884 | B2 * | 9/2010 | Cheich | B65B 55/20 53/472 |
| 7,814,733 | B2 * | 10/2010 | Carlson | B65B 55/20 53/472 |
| 7,886,125 | B2 | 2/2011 | Abbey | |
| 9,056,693 | B2 * | 6/2015 | Lattanzi | B65B 21/02 |
| 9,102,429 | B2 * | 8/2015 | Corradi | B65B 55/20 |
| 9,321,234 | B2 * | 4/2016 | Cheich | B65B 55/20 |
| 9,840,347 | B1 * | 12/2017 | Linnell | B65D 81/09 |
| 10,639,790 | B1 * | 5/2020 | Bacon | B07C 5/342 |
| 2002/0007618 | A1 | 1/2002 | Armington et al. | |
| 2004/0237469 | A1 * | 12/2004 | Serras Vila | B65B 61/207 53/263 |
| 2009/0173040 | A1 * | 7/2009 | Carlson | B65B 55/20 53/250 |
| 2010/0293898 | A1 * | 11/2010 | Cheich | B31D 5/0047 53/472 |
| 2011/0197550 | A1 * | 8/2011 | Carlson | B31D 5/0047 53/472 |
| 2011/0308204 | A1 * | 12/2011 | Corradi | B65B 57/14 53/472 |
| 2012/0167524 | A1 * | 7/2012 | Lattanzi | B65B 61/207 53/157 |
| 2013/0152511 | A1 * | 6/2013 | Derby | B65B 35/246 53/452 |
| 2015/0346708 | A1 * | 12/2015 | Mattern | B25J 9/0084 700/114 |
| 2016/0194104 | A1 * | 7/2016 | Jorissen | B65B 35/44 53/128.1 |
| 2020/0180804 | A1 * | 6/2020 | Slovencik | B65B 57/12 |
| 2020/0262058 | A1 * | 8/2020 | Santos | B25J 9/102 |

FOREIGN PATENT DOCUMENTS

| | | |
|---|---|---|
| EP | 1 539 474 B1 | 2/2010 |
| EP | 2 013 086 B1 | 6/2010 |
| EP | 2 204 325 A1 | 7/2010 |
| EP | 2 370 319 B1 | 1/2014 |
| FR | 2 654 071 | 5/1991 |
| FR | 2 963 323 | 2/2012 |

OTHER PUBLICATIONS

Written Opinion (with English translation) dated Aug. 11, 2017 for International application No. PCT/FR2017/051285.

International Preliminary Report on Patentability (with English translation) dated Nov. 27, 2018 for International Application No. PCT/FR2017/051285.

* cited by examiner

DEVICE AND METHOD FOR PACKING A CUSHIONING ELEMENT IN A CARTON

CROSS-REFERENCE TO RELATED APPLICATION

This application is the U.S. National Phase of PCT International Application No. PCT/FR2017/051285 filed May 24, 2017, which claims priority from French Application No. 1654813 filed May 27, 2016.

FIELD

The present invention relates to an automated packing device of a cushioning element in a carton, as well as its methods of implementation.

BACKGROUND

The presence of a cushioning element protects and wraps the items to be packed in a carton. These cushions make it possible to cushion the empty spaces inside a box, and thus to absorb the shocks inherent in transportation and to possible falls.

Although the placement, protection and packing of items in cartons is becoming more automated, operator intervention is often required.

In general, the distribution of these cushions by machines requires the presence of operators to adjust the amount of cushioning, guide these cushions into the spaces to be filled, or even to position them manually when leaving the machine, as in the elaboration of Document U.S. Pat. No. 6,718,729.

To assist the operator in his/her tasks, cells for determining the dimensions of cartons are placed upstream of the packing stations, such as Document U.S. Pat. No. 5,829,231, which discloses the determination of the dimensional features of the cartons by the reading of bar codes, or Document EP 2 013 086, which describes the determination of the empty space of a container by an appropriate probe.

Automated cushioning placement systems in cartons have been developed, such as Document U.S. Pat. No. 7,886,125, which discloses the vertical positioning of paper quilted by a piston, Document U.S. Pat. No. 7,665,275, which describes the timing element distribution by an inclined plane, or Document EP 2 204 325, which describes the vertical distribution of a paper strip of a determined length, according to the prior determination of the empty space of the carton. These documents therefore describe a random placement of cushioning element in a carton, which does not necessarily ensure optimum cushioning of the packaged articles.

Document EP 2 370 319 discloses the placement, by a gripper arm, of custom-made plastic bags, according to the distribution of the geometry of the empty space of a carton. This system accurately positions the cushioning elements around the articles, but does not ensure a placement under stress of the cushioning elements, ensuring a positional retention of the articles in a compressed manner in a carton.

SUMMARY

The present invention thus proposes a device and methods for automated packing of a cushioning element in a carton, making it possible to overcome the aforementioned drawbacks. Thus the device for automatic packing of cushioning element(s) in a carton, according to the invention, is intended to be mounted along a conveyor directed along a longitudinal axis.

The packing device comprises a robotic cell associated with a cushioning element storage zone, the robotic cell comprising at least one means of gripping of a cushioning element, while the storage zone comprises at least one magazine, comprising at least one cassette that can move along a transverse axis from a loading position to an unloading position.

It should be added that the robotic cell is associated computationally by a robot to the magazine.

It should be noted that the robotic cell is contiguous along the transverse axis (X, X') to at least one magazine (18).

It should be noted that in the unloading position, a cassette is located below at least one gripping means of a cushioning element.

It should also be noted that the robotic cell comprises a frame consisting of uprights, while the conveyor is intended to pass right through the uprights.

According to one embodiment, at least one cassette is removable.

According to one embodiment, at least one cassette is receives the cushioning elements from at least one cushioning element distributor directed along a longitudinal axis.

According to one feature, at least one means of gripping is movable along a vertical axis.

According to an additional feature, at least one means of gripping comprises a gripper comprising two jaws movable along a longitudinal axis.

According to one embodiment, at least one means of gripping is cooperating with a means of vertical releasing a cushioning element.

According to one complementary feature, at least one means of gripping is carried by two movable plates along vertical axes.

The invention also relates to a method of inserting at least one cushioning element into a carton, by a packing device according to the invention, the method comprising the following steps:

providing a cushioning element in a cassette from a cushioning element distributor, movement inwards along a transverse axis of a cassette towards an unloading position under a means of gripping configured to grip the cushioning element, movement downwards along a vertical axis of the means of gripping configured to grip a cushioning element, up to substantially the bottom of a cassette in the unloading position, loading the means of gripping with the cushioning element, movement upwards, along a vertical axis, of the means of gripping loaded with the cushioning element, movement outwards, along a transverse axis, of the cassette from an unloading position to a position awaiting loading, movement downwards, along a vertical axis, of the loaded means of gripping the cushioning element, release of the cushioning element, and movement upwards, along a vertical axis, of the means of gripping the cushioning element to a loading position.

According to a complementary feature, the method comprises a step of acquisition by a robot of a length, width and height of a loaded carton, while it includes a step of determining the number and type of cushioning elements to be inserted in the loaded carton.

Other features and advantages of the invention will become apparent from the description which follows, with reference to the accompanying drawings which are given by way of non-limiting examples.

BRIEF DESCRIPTION OF THE DRAWNGS

FIGS. 1 to 6d are views of a packing device according to one embodiment of the invention.

FIG. 1 is a perspective view of the packing device.

FIG. 2 is a side view of the packing device in the loading position.

FIG. 3 is a side view of the packing device in the unloading position.

FIG. 4 is a partial perspective view of the packing device, in an intermediate position of a means of gripping.

FIG. 5 is a partial perspective view of the packing device, in a releasing position of a cushioning element.

FIG. 6d is a front view of an embodiment of the means of gripping.

DETAILED DESCRIPTION

Figure 1:
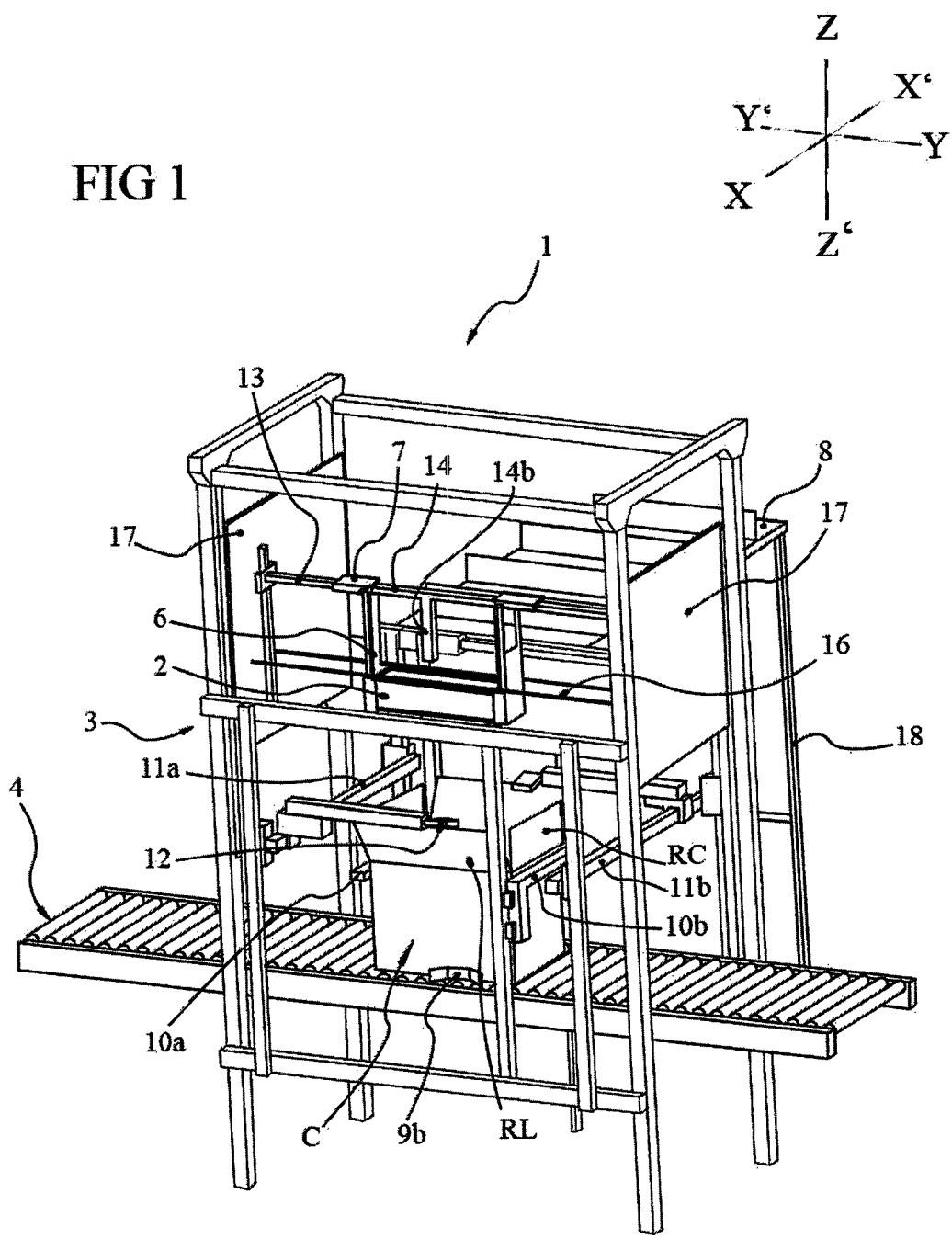

Thus, the packing device (1) of a cushioning element (2), advantageously elastically compressible in a carton (C), according to the illustrated embodiment, is presents itself in form of a robotic cell (3) associated with at least one cushioning element storage zone, which is provided by at least one magazine (18) equipped with moveable cassette(s) (8).

A robotic cell (3) according to the invention comprises at least one means for placing the carton (C) at a zero point of reference, advantageously at least one means for detecting the coordinates of the ends of the flaps, advantageously at least one means of partial opening of at least one flap, at least one means of gripping.

The term carton (C) is used interchangeably in this description for designating a receptacle, a box or container in which is packed at least one item and at least one cushioning element (2).

By zero point is meant the reference point advantageously represented by the center of the frame of the robotic cell (3), directly above the conveyor (4). It is understood that a zero point may be at any location, depending on the configuration of the robotic cell (3). The position of the zero point of reference can change according to the number of cushioning elements (2) to be introduced, namely according to the even or odd number, as explained in more detail later in the description.

Three orthonormal axes at the zero point are considered, namely a longitudinal axis (Y, Y'), a transverse axis (X, X') and a vertical axis (Z, Z'), as well as a succession of axes parallel thereto, defining the position of the various elements of the packing device (1). In the following description, these different parallel axes are named in the same way.

It is understood by an external or internal position or direction, a position or a direction—respectively distant or close—of the zero point.

It should be added that the packing device (1) according to the invention comprises a robotic cell (3) intended to be associated with a conveyor (4) with a belt or rollers, preferably with rollers, which conveys the cartons (C) along a longitudinal axis (Y, Y'), at least one cushioning element storage zone and advantageously at least one cushioning element (2) distributor D1, D2.

In general terms, by means of a cushioning element distributor D1, D2, it is understood a device which distributes an element that is advantageously compressible.

According to one embodiment, the distributor forms a cushioning element (2) from a folded paper strip, as explained in more detail in the following description.

The packing device (1) advantageously comprises a presence sensor for detecting the arrival of a carton (C) at the level of the robotic cell (3). This presence sensor particularly operates the means of setting the zero point, as explained in more detail in the following description.

It is understood that each of the moving elements is driven by a motorized device, as commonly used in the field of mechatronics, for example by pistons, slides, rails, chains, linear motors and/or belts.

According to other embodiments, the packing element device (1) comprises at least one means for determining the dimensions of a carton (C) before it is taken over by the robotic cell (3).

According to one feature, a means for determining the dimensions of a carton may be the reading of barcodes, the determination of the empty space or the determination of the length, width and height of a carton, by appropriate probes.

Packing of items in a carton is commonly done manually or semi-automatically.

Thus, the items to be packed are advantageously placed—manually or automatically—in cartons upstream of the support by the packing device (1).

In general, a packing line, along a conveyor (4) or a succession of independent positions, firstly comprises a formatter, shaping the folded cartons, and finally advantageously a closer or also called an adhesive applicator, closing the carton flaps mechanically and sealing them with an adhesive.

In the case of a box without a flap, a suitable device positions a cover on the latter at the output of the packing device (1) according to the invention.

A carton (C) is commonly composed of two pairs of opposite flaps, namely two so-called short flaps (RC) and two so-called long flaps (RL), connected to the corresponding side walls of the carton (C).

A box does not comprise flaps, and therefore consists of side walls, namely two so-called long walls and two so-called short walls, and a bottom wall.

At the outlet of a forming machine, the flaps are in a neutral position, namely, in the extension of the side walls, perpendicular to the bottom wall in vertical fashion.

By a partially open or even open position of the flaps, is understood as a position of the flaps directed outwards, while by a partially closed position, or even closed, is understood as a position of the flaps directed inwardly.

A carton orientator, also called a loading orientation changer, allowing the rotation and alignment of the cartons in a desired direction, is advantageously placed upstream of the packing device (1) according to the invention.

A carton generally has a rectangular section, composed of large sides and small sides, namely lateral walls known as long and short respectively. A carton is conveyed towards the packing device (1), preferably in the longitudinal direction, namely the large sides are directed along the longitudinal axis (Y, Y'), while the short sides are directed along a transverse axis (X, X').

It is understood that a carton, having a square section, can be loaded in the same manner as previously described, without departing from the scope of the invention.

According to the embodiment illustrated, for the sake of optimizing the time taken to take charge of a carton by the packing device (1) according to the invention, it is understood that the cartons are oriented lengthwise to reduce the number of cushioning elements to be introduced, so it is the long flaps (RL) which are partially open, while the short flaps (RC) are left in their neutral position of arrival, or even maintained in a vertical position by appropriate means, as explained in more detail in the following description.

It is understood that the cartons could be oriented in the direction of the width, however a greater number of cushioning elements would be necessary to cushion the items in a carton, which would imply a more significant loading time, therefore a lower rate and, necessarily for large cartons, the width of the conveyor should be greater. It is understood that this configuration is not preferred.

According to one embodiment, a cushioning element (2) is a compressible element having elastic properties.

According to the preceding embodiment, the cushioning elements (2) are advantageously hollow profiles, such as tubes of crinkled paper, formed from a paper strip folded on itself, namely, assembled on its lateral and glued edges. This paper strip is creased in both a longitudinal and a radial direction by a suitable distributor, such as that described in Document EP 1 539 474. This paper strip is cut to a predetermined length, preferably along the length or width of a carton, that is to say preferably a length greater than the length of a carton (C), wherein at least one cushioning element (2), thus produced, is positioned in a compressed state.

The cushioning elements (2) can also be of different materials, shapes and structures.

The cushioning elements (2) are preferably of a tubular shape, but it could be otherwise, such as triangular, square or rectangular.

These compressible elements are firstly compressible at least longitudinally by a means of gripping, in order to be inserted in a carton, preferably placed parallel to the long flaps (RL) of a carton, but it could be otherwise, these compressible elements being placed parallel to the side walls, preferably the so-called long walls.

According to the illustrated embodiment, at least one cushioning element (2) is positioned at least at the level of a pair of flaps, preferably the short flaps (RC).

According to one embodiment, not shown, in the case of a loaded box, at least one cushioning element (2) is positioned at the so-called short side walls.

It should be added that according to some embodiments, the lower end, at least one cushioning element (2) is positioned at the upper ends of the side walls of the carton.

Their elastic properties allow them to exert a longitudinal pressure against the walls of the carton and advantageously the flaps arranged in their extension, ensuring their maintenance in position inside the latter.

It should be noted that the positioning of a cushioning element (2) against the walls of a carton in a compressed manner increases its compressive strength properties compared with an uncompressed positioning.

By the term "type of cushioning element (2)" is meant a shape or an appropriate length of a cushioning element (2), to distribute according to the sizing of the carton and in particular its positioning, namely at the bottom of the carton or on the surface of the latter.

These compressible elements are also compressible radially during their positioning in a carton, especially one next to each other, preferably in the width direction and vertically when closing the flaps or the positioning of a lid, ensuring a constrained holding the packed items.

In the field of mechatronics, we call an automaton, more precisely an industrially programmable automaton (IPA), a computer managing physical inputs and outputs, used to automate processes such as controlling machines on an assembly line or controlling automatic handling systems.

A sensor, such as a presence sensor, or a cell, such as a distance cell, are devices transforming a physical quantity into a signal, which is transmitted and interpreted by an automaton, to control in this case, the packing device (1).

According to one embodiment, the automaton determines, according to the dimensions of the carton, the height of the corresponding flaps by the height of the lateral walls of the carton, according to a reference table, of standard dimensions of the cartons usually used, prerecorded in the automaton.

According to another embodiment, the automaton determines the height of the side walls of a carton according to the coordinates of the ends of the flaps, according to a reference table, prerecorded in the automaton, of standard dimensions of the cartons usually used.

According to one embodiment, the coordinates of the ends of the side walls are transmitted to the automaton.

The latter information determines the vertical stroke of at least one means of gripping and/or plates (17), in view of the release of a cushioning element (2) in a carton, as explained in more detail in the following description.

According to the illustrated embodiment, the robotic cell (3) comprises a frame consisting of uprights, advantageously at least four uprights, and plates (17) advantageously movable, preferably two parallel plates (17) arranged transversely to the axis longitudinal (Y, Y').

According to one feature, the plates (17) are movable in translation along vertical axes (Z, Z').

It should be noted that the plates (17) carry at least some rails, at least one means of gripping the cushioning element (2), and advantageously at least one vertical means of release (14), as explained in more detail in the following description.

According to the previous embodiment, the robotic cell (3) is thus raised by the uprights, so that a cassette (8) can move below the means of gripping, while the conveyor (4) is intended to pass through the uprights of the robot cell (3), as explained in more detail below.

The robotic cell (3) thus comprises an inlet and an outlet intended for the passage of the conveyor (4).

In other words, according to the illustrated embodiment, at least one portion of the robotic cell (3) is arranged vertically above the conveyor (4), that is to say that the conveyor (4) passes right through the frame uprights, while the robotic cell comprises at least one means of gripping, preferably at least one gripper (6) movable along a vertical axis (Z, Z'), consisting of jaws (7) movable in translation along a longitudinal axis (Y, Y').

Note also that the packing device (1) comprises at least one cassette (8) movable in translation along a transverse axis (X, X'), acting as at least one cushioning element supply source arranged in a magazine acting as a cushioning element storage zone. These different elements will be described in more detail in the following description.

According to other embodiments, not shown, a means of gripping comprises a first gripper (6) consisting of jaws (7) movable in translation along a longitudinal axis (Y, Y'), and a second gripper consisting of movable jaws (7b) in translation along a transverse axis (X, X'). These two grippers are intended to grasp and compress a cushioning element (2) in the two aforementioned directions.

Preferably, the packing device (1) is equipped with at least two cassettes (8), more preferably three cassettes (8), or even four cassettes (8), each intended to receive at least one type of cushioning element.

It should be added that according to the illustrated embodiment, at least one cassette (8) is arranged in a magazine (18) arranged in the extension of the robotic cell (3), that is to say at least one magazine (18) is attached to the robotic cell (3), along the transverse axis (X, X').

Note that according to other embodiments, a packing device (1) comprises two magazines (18) arranged in opposition to a robotic cell (3), in other words, a robotic cell (3) is surrounded on either side by two magazines (18) aligned along the transverse axis (X, X').

According to the preceding embodiments, each of the magazines (18) is adapted to move at least one cassette (8) facing the robotic cell (3), namely to alternately position a cassette (8) below a means of gripping.

It is understood that a cassette (8) is intended to move below a means of gripping, when the latter is in the upright position, in a resting position waiting for loading.

Figure 1A:
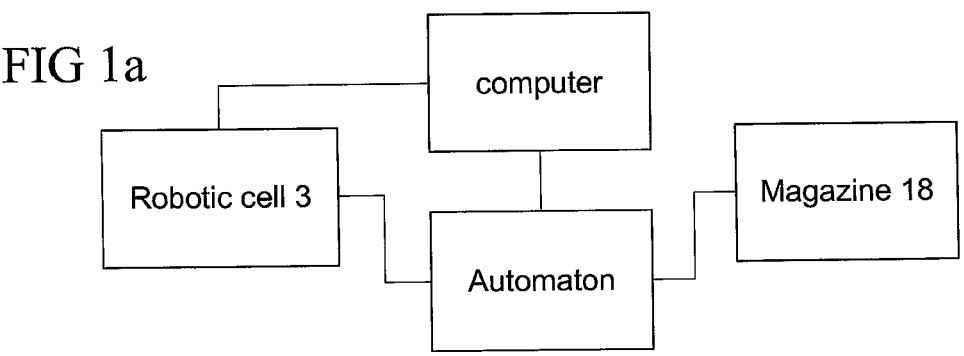
FIG. 1a is a flowchart illustrating the computational control of the automaton.

According to a complementary feature, the robotic cell (3) is associated computationally by an automaton to the magazine(s) (18), see FIG. 1a.

It should also be noted that according to one embodiment, the uprights of the robotic cell (3) are attached by at least one mechanical connection to at least one magazine (18).

According to one embodiment, not shown, at least one cassette (8) is removable from the magazine (18) which carries it, in order to be loaded with a cushioning element (2), advantageously by at least one distributor located at another place than the packing device according to the invention. A suitable device thus loads and unloads at least one cassette (8) in a magazine (18), either automatically or in an operator-assisted manner.

It should be recalled that the robotic cell (3) comprises at least one means of gripping, preferably at least one gripper (6), more preferably at least three grippers (6), preferably four grippers (6), intended to supply a carton (C) vertically, preferably along its width with at least one, two or three or even four cushioning elements (2). The grippers (6) are all movable in translation along vertical axes (Z, Z'), while their jaws (7) are movable in translation along longitudinal axes (Y, Y').

Figure 2:
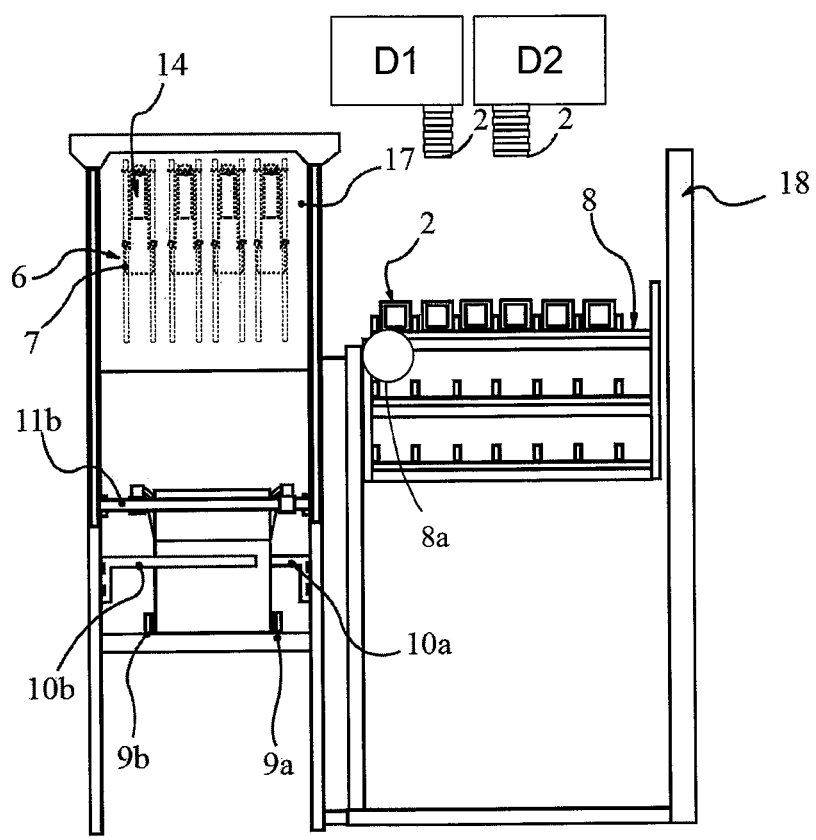

It should be noted that the grippers (6) are aligned next to each other, between the plates (17) which are oriented along longitudinal axes (Y, Y') as illustrated in FIG. 2.

Note that the grippers (6) are adapted to grasp a cushioning element (2) to be positioned in a carton.

According to an additional feature, a storage zone is advantageously associated with at least one cushioning element distributor (2), directed along a longitudinal axis (Y, Y'), facing at least one cassette (8), but it could be otherwise, at least one cassette (8) is fed by a cushioning element stock (2) produced beforehand.

Preferably, a storage zone is associated with at least one distributor, more preferably at least two distributors, located on either side of a magazine (18).

It should be recalled that in order to be loaded, a carton needs to be aligned along the longitudinal axis (Y, Y') and along the transverse axis (X, X') with respect to the robotic cell (3), that is to say, positioned at a zero point support.

According to the illustrated embodiment, at least one means of setting the zero point is constituted by at least one movable stop (9a, 9b), advantageously two stops (9a, 9b), namely a first stop (9a) and a second stop (9b), movable in translation along the transverse axis (X, X'), while two arms (10a, 10b), namely a first arm (10a) located at the entrance of the robotic cell (3) and a second arm (10b) located at the exit of the robotic cell (3), movable in translation along a longitudinal axis (Y, Y') and along a vertical axis (Z, Z'), centers a carton (C) to be loaded at a determined zero point of reference.

The stops (9a, 9b) are advantageously movable in simultaneous translational movements, which move towards and away at the same deflection in opposition, while the zero point, along the transverse axis (X, X'), is advantageously controlled by a verification of identical strokes of the stops (9a, 9b). The carton centered at the zero point, is advantageously kept under pressure by the stops (9a, 9b), in order to maintain its positioning during its loading, and released after loading for conveying to a closer or a device for the placement of a lid.

It is understood that an operator can close and seal the flaps of a carton or position a lid on a box.

It should be noted that according to the sizing of a carton, in particular for an odd number of cushioning elements (2) to be introduced, the stops (9a, 9b) simultaneously move the carton along the transverse axis (X, X') by a distance advantageously equal to half the width, that is to say, the distance oriented along a transverse axis (X, X'), of a means of gripping, preferably of a gripper (6).

The means of setting zero point are adapted to position any carton size.

According to one embodiment, the coordinates of the stops (9a, 9b) of the first arm (10a) and of the second arm (10b) are transmitted to an automaton, as explained in more detail in the following description, to determine the sizing of a carton, namely the width, length and height of the latter. The automaton thus determines, as a function of the dimensioning of the carton, the number and type of cushioning elements (2) to be introduced.

According to the illustrated embodiment, the stops (9a, 9b) are connected to the conveyor (4).

The first arm (10a) and the second arm (10b) can assume at least two vertical positions, namely a high resting position and a low support position.

According to one embodiment, the first arm (10a) and the second arm (10b) can also assume an intermediate position for holding the flaps, facing said flaps, advantageously the short flaps (RC), in order to maintain said flaps in vertical position, during the loading operations of at least one cushioning element (2).

Upon the arrival of a carton on the conveyor (4), the carton abuts against the second arm (10b) in the low position, while the first arm (10a) is positioned opposite the second arm (10b), each undergoing a simultaneous translation movement and opposite approach, in order to position the carton being handled at the zero point along the longitudinal axis (Y, Y').

Note that at least the centering management at a zero point reference of a carton along the longitudinal axis (Y, Y'), by the first arm (10a) and the second arm (10b), as well as along the transverse axis (X, X'), by the stops (9a, 9b), can be carried out according to at least three modes of operation.

According to one embodiment, the management of the zero point centering of a carton is achieved by transmitting to the automaton the sizing of the carton, previously determined by a means for determining the dimensions of a carton. The automaton controls the movement of the arms (10a, 10b) and the stops (9a, 9b) according to the transmitted information.

According to another embodiment, a distance cell, such as explained in more detail in the following description, arranged on each of the arms (10a, 10b), detects and controls the displacement of the arms (10a, 10b) for the zero point centering of a carton.

According to another embodiment, the management of the zero point centering of a carton is achieved by stopping the first arm (10a) and the second arm (10b) by limiting the torque on the arm motors (10a, 10b) and by a verification of identical strokes.

It should be added that according to the illustrated embodiment, the robotic cell (3) comprises a third arm (11a) and a fourth arm (11b), movable in translation along transverse axes (X, X') and along vertical axes (Z, Z'), as means for partially opening at least one flap, preferably at least one long flap (RL).

According to the illustrated embodiment, the third arm (11a) and the fourth arm (11b) are equipped at their respective ends with a flap (12) movable in rotation, allowing the opening of flaps arranged in opposition, preferably the long flaps (RL).

According to another embodiment, not shown, the third arm (11a) and the fourth arm (11b) are equipped at their respective ends with at least one hooking projection directed downwards, that is to say in the direction of the conveyor, advantageously two hooking projections, being in the form of a hook, allowing the capture of the end of a flap, preferably a long flap (RL), in view of its opening.

The opposite translational movements toward the outside of the third arm (11a) and the fourth arm (11b) allow at least partial opening of the flaps arranged in correspondence, preferably the long flaps (RL).

According to one embodiment, as previously explained, distance cells, namely two distance cells for the short flaps (RC) and two distance cells for the long flaps (RL), determine the coordinates of the ends of the flaps, at the zero point of the carton, to its support by the robotic cell (3).

According to the preceding embodiment, the coordinates of the ends of the short flaps (RC) are advantageously determined during the setting of the zero point by the first arm (10a) and the second arm (10b), while the coordinates of the ends of the long flaps (RL) are determined prior to at least partial opening of the latter, by the third arm (11a) and the fourth arm (11b).

According to one embodiment, a distance cell is located on each of the first and second arms (10a, 10b), for determining the coordinates of the ends, advantageously of the short flaps (RC), while a distance cell is located on each of the third and fourth arms (11a, 11b), for the determination of the coordinates of the ends, advantageously of the long flaps (RL).

According to one embodiment, a distance cell is located on each of the first and second arms (10a, 10b), for determining the coordinates of the ends, advantageously, of the so-called short walls, while a distance cell is located on each of the third and fourth arms (11a, 11b), for the determination of the coordinates of the ends, advantageously of the so-called long walls.

According to some embodiments, these distance cells communicate with the automaton for determining the coordinates of the ends of the flaps or the side walls, for the determination of the size of the loaded carton, namely the width, the length and advantageously the height of a carton. The automaton thus determines, as a function of the dimensioning of the carton, the number and the type of cushioning elements (2) to be introduced.

Thus, according to some embodiments, at least one distributor (D1, D2) produces on demand at least one cushioning element (2), according to the information transmitted by the automaton. One cushioning element (2) is fed into at least one cassette (8), while at least one means of gripping, preferably at least one gripper (6), inserting at least one cushioning element (2) produced on demand in a carton (C), more precisely a gripper (6) inserting a cushioning element (2).

According to one particular embodiment, the packing device (1) according to the invention comprises a single gripper (6), while the stops (9a, 9b) move the carton along the transverse axis (X, X'), given its filling by the repetition of the process of loading at least one cushioning element (2) by a single gripper (6).

According to some other embodiments, at least one distributor produces a certain type of cushioning element (2) in at least one cassette (8), that is to say that a cassette (8) is intended to receive at least one type of cushioning element (2), while at least one gripper (6) selects at least one cushioning element (2) positioned in a cassette (8) determined according to the information transmitted by the automaton.

Figure 3:
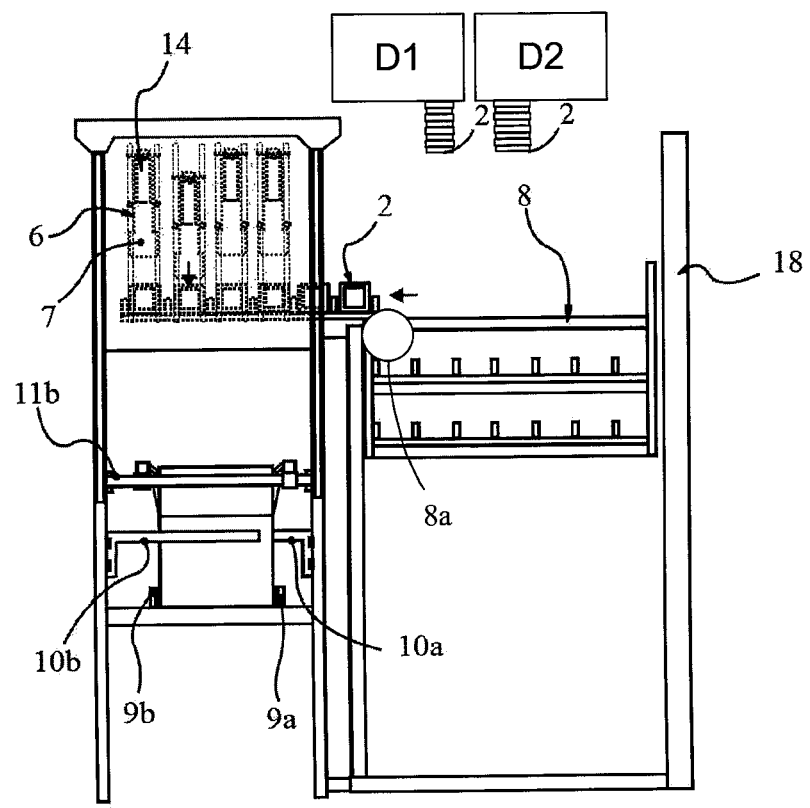

According to one feature, as illustrated in FIG. 3, a cassette (8) is in the form of a plate upon which separating parts are advantageously removable and adjustable according to the type of cushioning element (2) introduced. These separating parts are composed of vertical walls, maintaining in position and delimiting a location of a cushioning element (2) relative to another.

It should be recalled that a cassette (8) is movably mounted on a magazine (18), allowing a translational movement along a transverse axis (X, X'), a loading position, to a position of unloading and vice-versa, as illustrated in FIGS. 2 and 3.

It should be noted that one cassette (8) is preferably mechanized, whose operation is managed by the automaton.

It should also be noted that the automaton manages the synchronization of the movements of the means of gripping (6) and the cassettes (8), in view of the loading and unloading of a cushioning element (2), by means of gripping a cassette (8a).

A loading position advantageously corresponds to a position facing a distributor, while an unloading position corresponds to a position facing at least one means of gripping, preferably at least one gripper (6).

According to an additional feature, one gripper (6) is formed from two jaws (7) movable in translation along a longitudinal axis (Y, Y'). One gripper (6) is mounted on at least one set of rails (13) along longitudinal axes (Y, Y'), sliding along a vertical axis (Z, Z'), connected on both sides to the plates (17) advantageously mobile from the frame, allowing the vertical raising and lowering of the latter and the approximation and spacing of the jaws (7) along the set of rails (13).

It should be recalled that the plates (17), being movable in vertical translation, the lowering of the grippers can be modulated according to the height of a carton.

Figure 4:
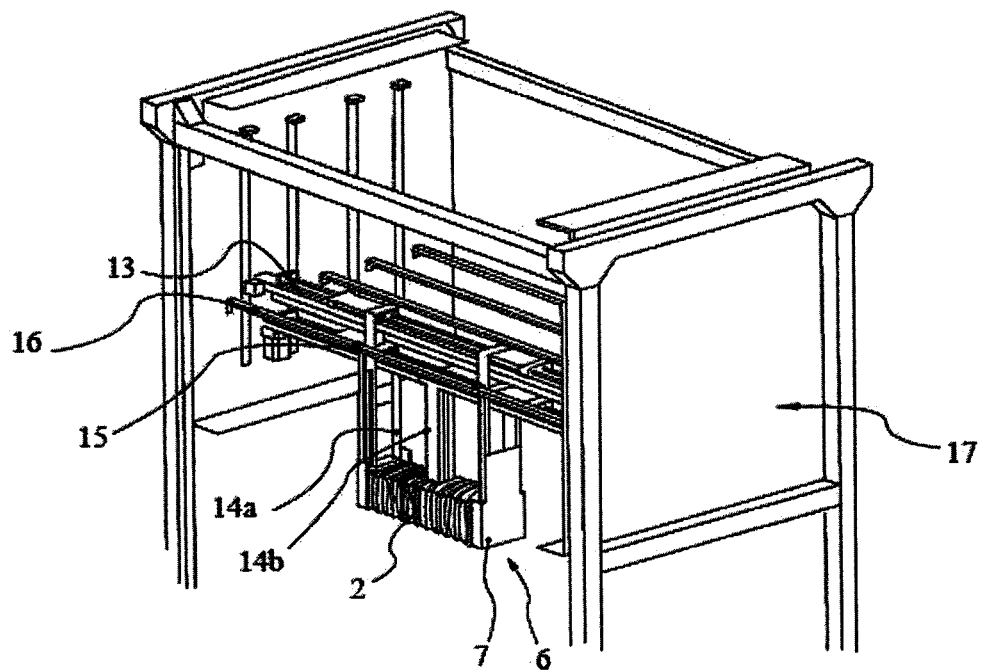

One gripper (6) is also equipped with a vertical means of release (14) for a cushioning element (2), which is presented, as shown in FIG. 4, by two lateral support points (14a), arranged inside the jaws (7) and advantageously from a support point (14b). In a common manner, a suitable mechanism moves either the jaws (7) or the vertical means of release (14) relative to each other vertically, to release a cushioning element (2).

According to one embodiment, the jaws (7) are fixed along the vertical axis (Z, Z') with respect to the rails (13) carrying them, while the vertical means of release (14) is movable along the vertical axis (Z, Z'), but it could be otherwise, the vertical means of release (14) being fixed along the vertical axis (Z, Z') relative to the rails (13) which carries it, while the jaws (7) are movable along the vertical axis (Z, Z'), as illustrated in FIGS. 4 to 6d.

According to the embodiment illustrated in particular in FIG. 4, the vertical means of release (14) is fixed to the set of rails (13), while the jaws (7) are connected to the outside of the vertical means of release (14) by the slides. The jaws (7) are equipped with bottom stops (15) arranged at their upper ends, which extend transversely outwards along the transverse axis (X, X'). These bottom stops (15) are intended to interact with crossmembers (16) arranged between the plates (17).

Figure 5:
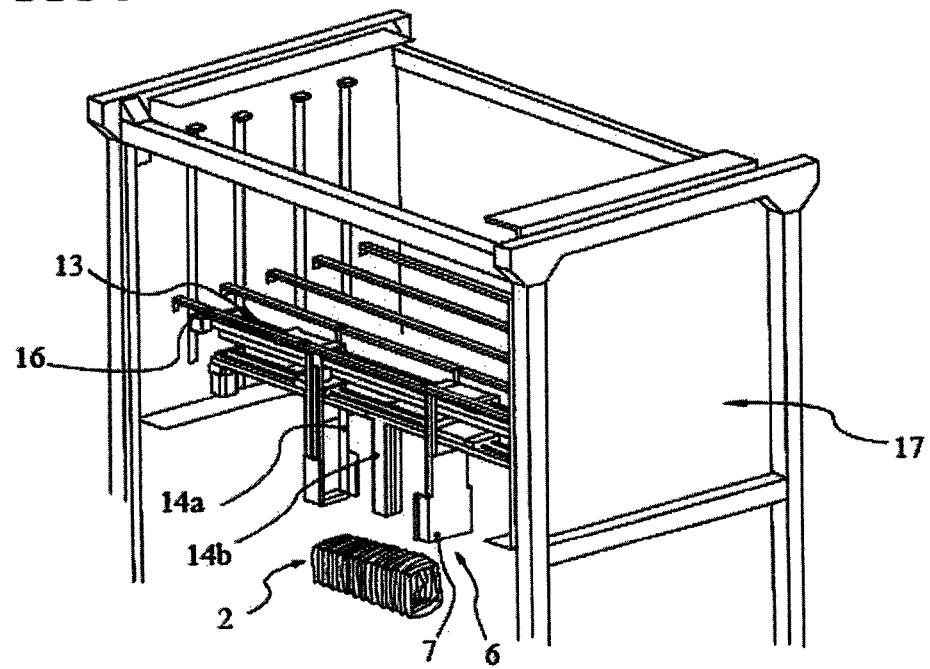
Figure 6A:
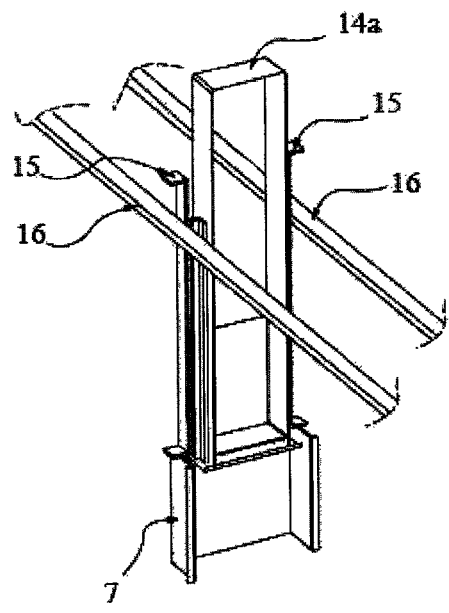
FIG. 6a is a partial perspective view of a means of gripping in an intermediate position.
Figure 6B:
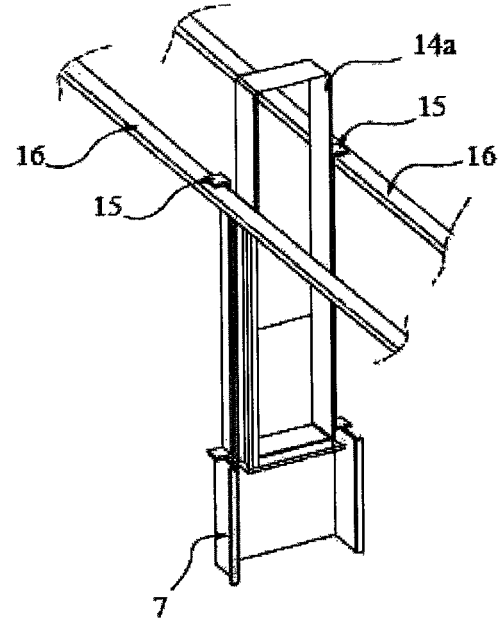
FIG. 6b is a partial perspective view of a means of gripping in a low position.
Figure 6C:
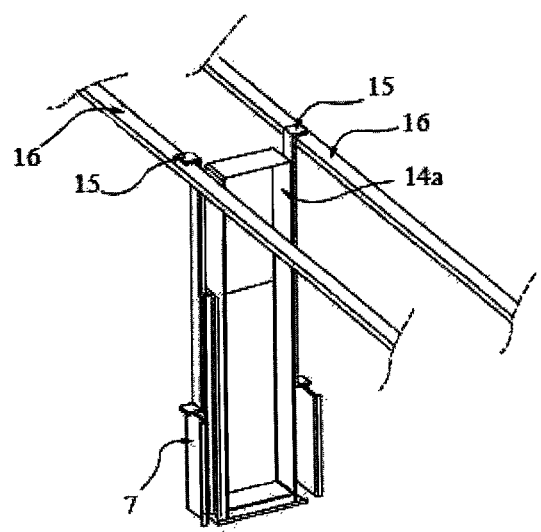
FIG. 6c is a partial perspective view of a means of gripping in a releasing position of a cushioning element.
Figure 6D:
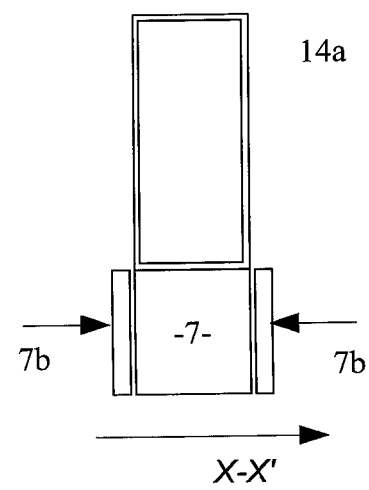

According to the preceding embodiment, the descent of a gripper by the lowering of the set of rails (13), induces the interaction of the lower stops (15) with the crosspieces (16), the jaws (7) remaining blocked at the crossmembers (16), while the vertical means of release (14) continues its downward stroke, releasing a cushioning member (2) into the loaded carton, as shown in FIG. 5, and further illustrated in FIGS. 6a to 6d.

Thus, a cushioning element (2) is advantageously produced on demand by a distributor, distributed on a cassette (8), compressed by a gripper (6), which moves it vertically, and released by the vertical means of release (14), given its positioning in a carton (C), in which it adopts a partially compressed shape, allowing it to be held in position against at least one pair of flaps, preferably the short flaps (RC), but it could be otherwise, a cushioning element (2) is held in position by the ends of the so-called short side walls.

This positioning ensures that a means of gripping, during its descent, does not damage one or more items placed in a carton.

The long flaps (RL) are therefore positioned partially open, so that the introduction of a cushioning element (2) in a carton, does not abut against the end of a long flap (RL), or even closes a long flap (RL) in an undesirable manner.

These flap configurations in the partially open position for the long flaps (RL) and in the neutral position for the short flaps (RC) induce a placement of the cushioning elements (2) in the direction of the length of the carton, namely that a gripper (6) longitudinally compresses a cushioning element (2). This mode of placement of at least one cushioning element (2), allows that the short flaps (RC) arranged longitudinally in a neutral position, does not interfere with the introduction of a cushioning element (2), while the partially open positioning of the long flaps (RL), arranged transverse to the longitudinal axis (Y, Y'), also does not interfere with the introduction of a cushioning element (2), such as explained previously.

Thus at least one packing device (1) according to the invention allows the superposition of at least one cushioning element (2) on the surface of at least one item, prior to sending by the conveyor of the carton advantageously to a closure, for closing and sealing the carton.

It should be noted that the closure of the short flaps (RC) positions and compresses at least vertically at least one cushioning element (2), given the maintenance under pressure of at least one item in a carton, but it could be otherwise—the positioning of a lid positions and at least vertically compresses at least one cushioning element (2).

Thus, the closure of the flaps or the placement of a lid, allows at least one cushioning element (2) to substantially match the shape of at least one item and to fill the empty space above the latter.

The invention also relates to methods for implementing the packing device (1) according to the invention.

It should be noted that the methods according to the invention comprise a step of positioning at least one cushioning element (2) under stress against at least the ends of two side walls arranged in opposition, preferably also against the flaps arranged along transverse axes (X, X'), preferably the short flaps (RC).

It should be recalled that at least the management of the zero point centering of a carton along the longitudinal axis (Y, Y'), the first arm (10a) and the second arm (10b), as well as along the transverse axis (X, X'), by the stops (9a, 9b), can be performed in at least three modes of operation.

According to one embodiment, the automated packing method of a cushioning element (2) in a carton (C) by a robotic cell (3), comprises the following steps:
  determining the dimensions of the carton before it is taken over by the robotic cell (3), by means of determining the dimensions of a carton,
  transmitting the dimensions of the carton to an automaton which determines the number and type of cushioning elements (2) to be introduced,
  centering, at a zero point, a carton on a conveyor (4) with respect to the robotic cell (3), according to the dimensions of the carton previously transmitted to the automaton,
  inserting at least one cushioning element (2) in the carton, according to the predetermined information, According to another embodiment, the method of automated packing of a cushioning element (2) in a carton (C) by a robotic cell (3), comprises the following steps:
  determining the coordinates of the ends of the long flaps (RL) and the short flaps (RC) at the zero point,
  centering at a zero point, a carton on a conveyor (4) with respect to the robotic cell (3),
  determining by an automaton the type and the number of cushioning elements (2) to be loaded, according to the coordinates of the ends of the long flaps (RL) and the short flaps (RC) at the reference zero point,
  inserting at least one cushioning element (2) in the carton, according to the predetermined information, According to another embodiment, the method of automated packing of a cushioning element (2) in a carton (C) by a robotic cell (3), comprises the following steps:
  centering at a zero point, a carton on a conveyor (4) with respect to the robotic cell (3), by checking identical strokes of the stops (9a, 9b), and the arms (10a, 10b), independently,
  determining the height of the carton by a distance cell and transmission of this information to an automaton
  transmitting the width and the length of the carton to an automaton, according to the positions of the stops (9a, 9b) and the arms (10a, 10b),
  inserting at least one cushioning element (2) in the carton, according to the predetermined information, It should be added that the setting of the zero point of a carton comprises the following sub-steps:
  placing the second arm (10b) in a lower position,
  advancing the carton towed by the conveyor (4) in abutment against the second arm (10b),
  placing the first arm (10a) in a lower position, centering the carton, along the longitudinal axis (Y, Y'), by bringing the first arm (10a) and the second arm (10b) closer together, advantageously releasing of the carton centered along the longitudinal axis (Y, Y'), by spacing the first arm (10a) and the second arm (10b), centering of the carton along the transverse axis (X, X') by simultaneously bringing the first stop (9a) and the second stop (9b) together, pressurizing the carton by the stops (9a, 9b), It should be noted that the methods according to the invention advantageously comprise a step of at least partially opening the flaps, advantageously long flaps (RL), which comprises the following sub-steps:

moving the third arm (11a) along at least one vertical axis (Z, Z'), until the distance cell determines the coordinates of the long flap (RL) arranged in correspondence, moving the fourth arm (11b) along at least one vertical axis (Z, Z'), until the distance cell determines the coordinates of the long flap (RL) arranged in correspondence, transmission to the automaton of the coordinates of the ends of the long flaps (RL), for the calculation of the width of the carton, eventually moving the stops (9a, 9b) for an odd number of cushioning element (2), moving the third arm (11a) and the fourth arm (11b) along a transverse (X, X') and vertical (Z, Z') axis to position the ends of the third arm (11a) and the fourth arm (11b), that is to say at least one respective hooking projection or flap (12) at the ends of the long flaps (RL) arranged in correspondence, moving outward, along a transverse axis (X, X'), of the third arm (11a) and the fourth arm (11b), in order to open at least partially the long flaps (RL), It should be noted that the step of inserting at least one cushioning element (2) comprises the following sub-steps:

Acquisition by the automaton of the length, width, and height of a loaded carton determination of the number, the type and in particular the length of the cushioning elements (2), according to the dimensioning of a loaded carton, movement inward, along a transverse axis (X, X'), of a cassette (8), towards an unloading position, movement downward, along a vertical axis (Z, Z'), a gripper (6), up to substantially the bottom of a cassette (8) in the unloading position, coming together of the jaws (7), along a longitudinal axis (Y, Y'), in a ratio depending on the length of the cushioning element (2) produced, in order to compress and grasp it, movement upward, along a vertical axis (Z, Z'), of the loaded gripper (6), movement outward, along a transverse axis (X, X'), of the unloaded cassette (8), from an unloading position to a position awaiting loading, eventual movement of the plates (17) along an axis (Z, Z') according to the height of the carton, movement downward, along a vertical axis (Z, Z'), of the loaded gripper (6), release of the cushioning element (2) by the vertical means of release (14), spacing, along a longitudinal axis (Y, Y'), of the jaws (7) of the unloaded gripper (6), movement upward, along a vertical axis (Z, Z'), of the unloaded gripper (6) to a loading position.

The invention claimed is:

1. An automatic packing device (1) for packing of cushioning element(s) (2) in a carton (C), said automatic packing device being configured to be mounted along a conveyor (4), said packing device (1) comprising:
a robotic cell (3), and
a storage zone,
said robotic cell (3) comprising at least one means of gripping a cushioning element (2) in form of tubes of crinkled paper, said at least one means of gripping comprising a gripper (6) comprising two jaws (7) movable along a longitudinal axis compressing the cushioning element (2) when gripped,
wherein the storage zone comprises at least one magazine (18) comprising at least one cassette (8) receiving cushioning elements (2) from at least one cushioning element distributor (D1, D2) configured to deliver cushioning elements (2) of different materials, shapes and structures, wherein the magazine is movable from a loading position corresponding to a position facing the at least one cushioning element distributor (D1, D2) to an unloading position where the cassette (8) is located below the at least one means of gripping a cushioning element (2),
the robotic cell (3) is associated computationally by an automaton to the magazine (18), wherein the automaton determines, as a function of acquired dimensions of the carton (C), a number and type of cushioning elements (2) to be introduced.

2. The packing device (1) according to claim 1, wherein the robotic cell (3) is contiguous to the at least one magazine (18).

3. The packing device (1) according to claim 1, wherein the robotic cell (3) comprises a frame including uprights, said conveyor (4) being intended to pass right through the said uprights.

4. The packing device (1) according to claim 1, wherein the at least one cassette (8) is removable.

5. The packing device (1) according to claim 1, wherein the at least one means of gripping is movable along a vertical axis.

6. The packing device (1) according to claim 1, wherein the at least one means of gripping is associated with a means of vertical release (14) of a cushioning element (2).

7. The packing device (1) according to claim 1, wherein the at least one means of gripping is carried by two plates (17) movable along vertical axes (Z, Z').

8. A method of inserting at least one cushioning element (2) into a carton (C) by a packing device (1), said method comprising the steps of:
acquisition by an automaton of a length, width and height of the carton (C);
determination by the automaton of a number and type of cushioning elements (2) comprising tubes of crinkled paper to be introduced into the loaded carton (C),
providing said at least one cushioning element in a cassette (8) from a cushioning element distributor (D1, D2),
movement of the cassette (8) to an unloading position under a means of gripping a cushioning element (2),
movement downward of the means of gripping a cushioning element (2) to substantially a bottom of the cassette (8);
loading and compressing of the cushioning element (2) in the means of gripping,
movement upward of the means of gripping loaded with a cushioning element (2), movement of the cassette (8) from which the cushioning element (2) has been unloaded from the unloading position to a position awaiting loading, movement downward of the means of gripping loaded with the cushioning element (2), release of the cushioning element (2), and movement upward of the means of gripping of the cushioning element (2) to a loading position.

* * * * *